United States Patent [19]

Nakatani

[11] Patent Number: 4,761,092

[45] Date of Patent: Aug. 2, 1988

[54] LOCK FOR TELESCOPING TUBULAR LEG

[76] Inventor: Koma Nakatani, 12-17 2 Chome Nakai, Shinjuku-ku Tokyo, Japan, 161

[21] Appl. No.: 900,221

[22] Filed: Jul. 31, 1986

Related U.S. Application Data

[63] Continuation of Ser. No. 657,932, Oct. 5, 1984, abandoned.

[51] Int. Cl.[4] .............................. F16B 7/10; F16D 1/12
[52] U.S. Cl. ..................................... 403/104; 403/109; 403/328; 403/374; 248/188.5
[58] Field of Search ............... 403/104, 109, 315, 363, 403/374, 108, 379, 378, 328; 248/188.5, 412, 337, 336

[56] References Cited

U.S. PATENT DOCUMENTS

| | | | |
|---|---|---|---|
| 2,185,782 | 1/1980 | Brittin | 403/104 X |
| 3,589,757 | 1/1971 | Mooney | 248/188.5 |
| 4,029,279 | 6/1977 | Nakatani | 248/188.5 |
| 4,174,900 | 11/1979 | Ina | 248/337 X |
| 4,185,936 | 1/1980 | Takahashi | 403/104 |
| 4,362,415 | 12/1982 | Metz et al. | 403/328 X |
| 4,596,484 | 6/1986 | Nakatani | 403/109 X |

FOREIGN PATENT DOCUMENTS

| | | | |
|---|---|---|---|
| 162806 | 4/1949 | Fed. Rep. of Germany | 403/396 |
| 1004571 | 3/1957 | Fed. Rep. of Germany | 403/363 |
| 68091 | 11/1957 | France | 403/363 |

Primary Examiner—Randolph A. Reese
Assistant Examiner—Peter M. Cuomo

[57] ABSTRACT

A locking mechanism for a telescoping support, such as a tripod leg, which includes an outer tubular section and a slidable inner tubular section is disclosed. The locking mechanism includes a U-shaped mounting bracket conforming to the cross-sectional shape of the outer tubular section and is held against sliding movement along the outer section by lip portions bent outwardly on either side of the bracket. The bracket is further retained against separation from the outer tubular section by a camming lever pivotably mounted between the two arms of the bracket on the side of the leg section opposite the base portion of the bracket, thereby closing the opening of the bracket. The camming lever is pivotable for cammingly engaging the inner tubular section through a window opening formed in the outer tubular section, thereby to lock the two sections against telescoping movement.

17 Claims, 2 Drawing Sheets

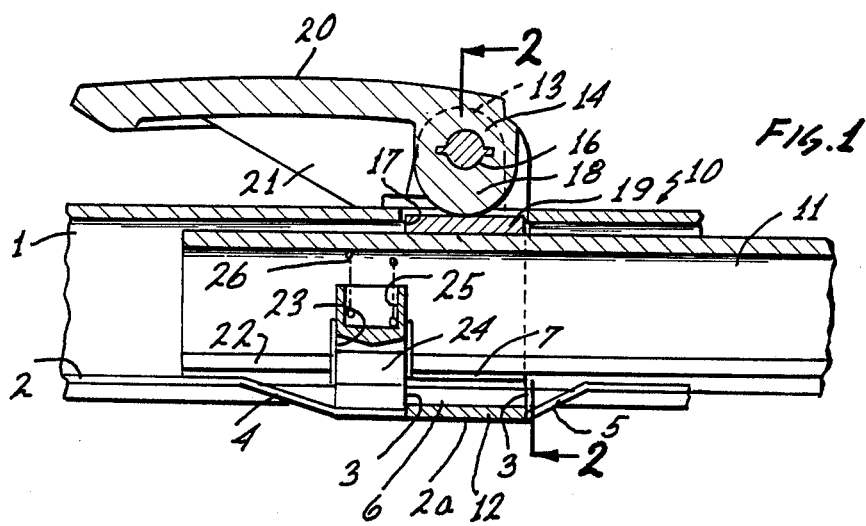
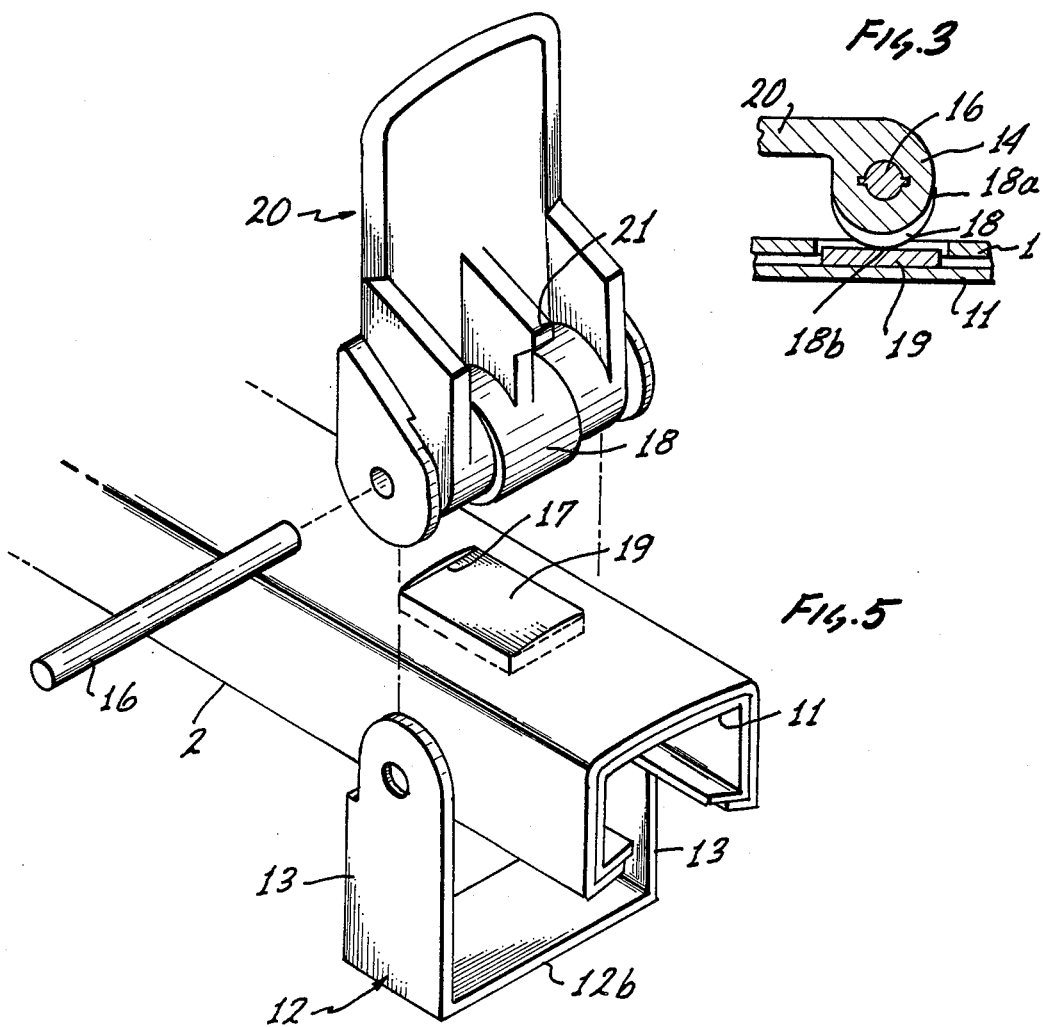

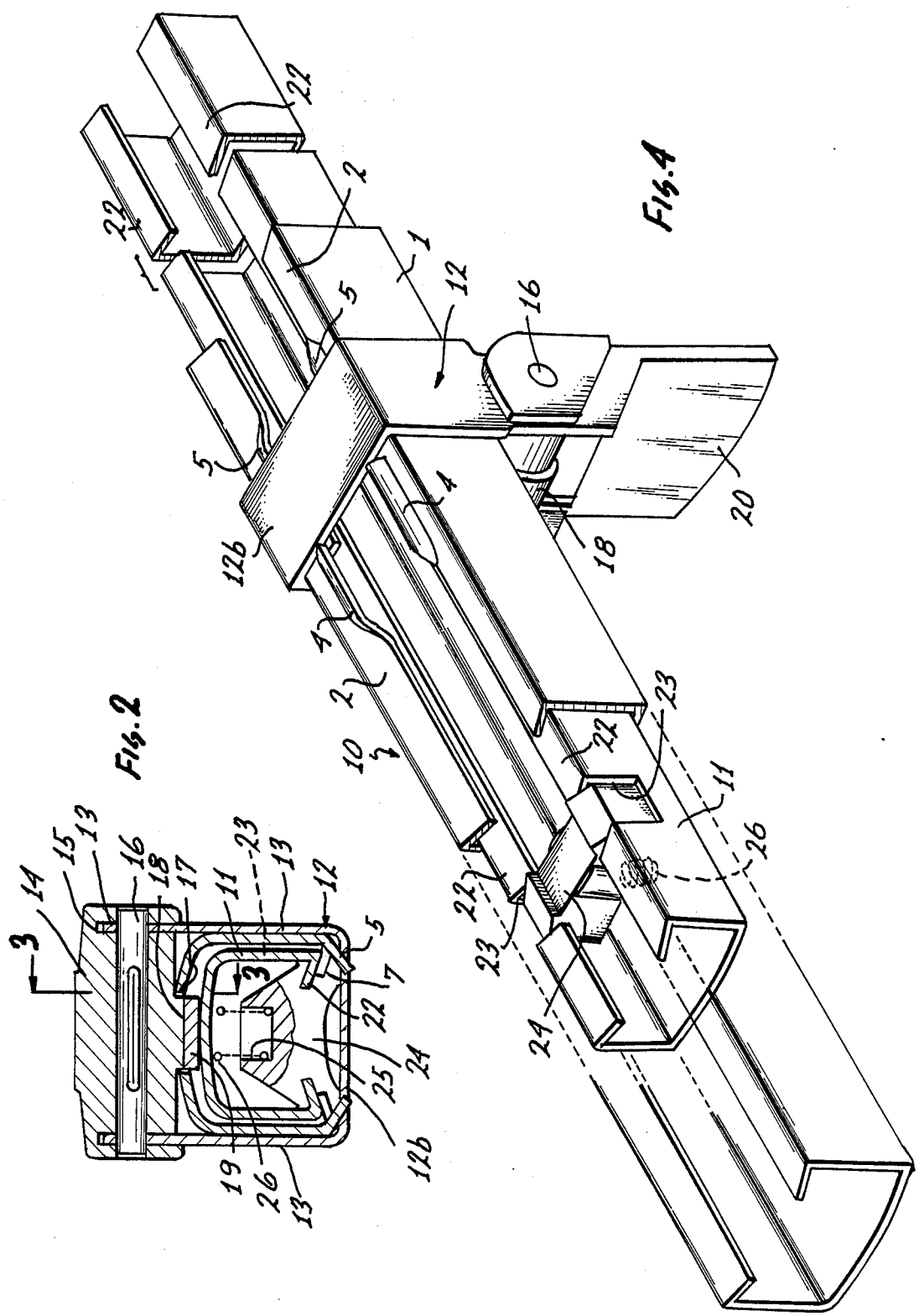

LOCK FOR TELESCOPING TUBULAR LEG

This application is a continuation of application Ser. No. 657,932, filed Oct. 5, 1984, now abandoned.

BACKGROUND OF THE INVENTION

FIELD OF THE INVENTION

The present invention pertains generally to continuously extendable supports and mechanisms for locking the same at arbitrarily extended positions, and is more particularly directed to a lock for a telescoping tubular leg, particularly for use in a tripod support.

BACKGROUND OF THE INVENTION

Existing tripod legs typically consist of a number of telescoping tubular sections of successively smaller cross section, each slideable within a larger section. Each successive pair of sections is provided with a lock for locking the smaller section against sliding movement within the larger section.

The locks previously used for tripod legs wherein the sections are channels of generally U-shaped cross section, typically are levers provided with a cam element and mounted to the larger diameter leg with the cam disposed over a window in the larger channel section. As the lever is pivoted towards the leg, the cam engages the smaller channel section through the window opening, locking the smaller channel against sliding movement within the larger channel section in a manner well known in the art.

Each channel section has three sides defining the U-shaped cross-section. The free edges of the U-shaped channel are in-turned to form a pair of lips projecting towards each other from opposing side walls of the longitudinal channel and extending the full length of each leg section.

In the past the cam locking levers were mounted to each leg section by means of tubular mounts of rectangular cross section slideable onto the corresponding leg sections and retained in alignment with the window opening by bending portions of the lips of the leg section to immobilize the lock mount against sliding movement after the lock has been correctly positioned.

The aforedescribed locks of the prior art are relatively costly in that the lever mounts are typically cast in metal to the particular dimensions required for each leg section. The locks manufactured in this manner have been found costly in terms of the materials and manufacturing required, and are further inconvenient in that additional steps, i.e., bending of the lips, must be carried out on each leg section after installation of the lever mount to secure the lock in place, which is a disadvantage in the manufacturing of such tripod legs.

SUMMARY OF THE INVENTION

The present invention overcomes these and other shortcomings of the prior art by providing a locking mechanism for a telescoping support such as the legs of a tripod. Such a support comprises an outer tubular section and an inner tubular section of smaller cross-sectional dimensions and slideable within the outer tubular section. The improved locking mechanism of the present invention includes a mounting bracket having a base portion joining two arms which extend therefrom, for example, a U-shaped bracket. The mounting bracket is open on one side and is dimensioned to conform to the cross-sectional shape of the outer tubular section such that the bracket may be fitted directly onto any intermediate portion of the tubular section without necessity of sliding it from one end onto the section as was the case in previously used tubular mounting brackets. The bracket is held against sliding movement along the outer section by lip portions bent outwardly on either side of the bracket. The bracket is further retained against separation from the outer tubular section by a camming lever pivotably mounted between the two arms of the bracket on the side of the leg section opposite the base portionn of the bracket, thereby closing the opening of the bracket. The camming lever is pivotable for cammingly engaging the inner tubular section through a window opening formed in the outer tubular section, thereby to lock the two sections against telescoping movement.

The locking mechanism may further comprise a stop member within the inner section spring biased for outward movement against the outer section. The stop member is normally held against such outward movement during telescoping extension of the two sections by the longitudinally extending lips of the outer section. The longitudinally extending lips are deformed in the vicinity of the mounting bracket for providing the aforementioned portions which restrain the bracket against sliding movement along the outer section. These deformed lip portions also are shaped so as to permit limited outward movement of the stop member under spring bias such that the stop member is brought into engagement with lip portions of the outer section limiting further telescoping extension of the inner section relative to the outer section.

In a presently preferred embodiment the tubular sections are each of generally U-shaped cross section defining an open longitudinal channel, and including longitudinally extending in turned lips projecting into said channel from either side thereof. Portions of these lips are broken and deformed outwardly of the channel in the vicinity and on either side of the mounting bracket such that the mounting bracket is held captive between the deformed lip portions against sliding movement along the outer section. The outwardly deformed lip portions also allow the stop member to move outwardly under spring urging such that the stop member is brought into abutment with lip portions underlying the bracket so as to limit the outer and inner sections against further telescoping extension. The deformed lip portions are ramped so as to urge the stop member inwardly into the channel and underneath the longitudinally extending lips against the spring bias to thereby readily allow telescoping retraction of the inner section into the outer section.

BRIEF DESCRIPTION OF THE DRAWINGS

FIG. 1 is a longitudinal cross-sectional view of the locking mechanism with the telescoping sections in fully extended and locked position.

FIG. 2 is an axial cross section taken along line 2—2 in FIG. 1.

FIG. 3 is a fragmentary view illustrating the locking action of the camming lever.

FIG. 4 is a perspective view of the telescoping support in a partially retracted position with the lock in released position, partly broken away to show the extension limiting stop member.

FIG. 5 is a fragmentary exploded view of the lock mechanism.

DETAILED DESCRIPTION OF THE PREFERRED EMBODIMENT

With reference to the drawings and FIG. 1 in particular, a telescoping support particulary suited for use as a tripod leg has an outer leg section 1 and an inner leg section 11 telescopically slideable within the outer leg section 1. A lever 20 provided with a cam portion 18 is pivotably mounted by means of shaft 16 between the parallel arms 13 of a U-shaped mounting bracket 12. The bracket 12 is dimensioned to fit around the outer leg section 1 and is held against detachment from the leg by the camming lever 20 which closes the gap between the bracket arms 13.

The cross section of each leg section 1 and 11 is generally U-shaped defining a longitudinally extending channel and include in-turned lips 2 which project inwardly towards each other within the channel, and which extend longitudinally the entire length of each section. Each lip 2 of the outer section 1 is cut at two points 3, and portions of the lips in the vicinity of the cuts are deformed by bending outwardly of the channel. This deformation creates two ramps 4, 5 with a recess 6 between the deformed lip portions 4 and 5 in which lie undeformed lip portions 7.

As best seen in FIG. 4, the U-shaped mounting bracket 12 is mounted to the outer leg section 1 intermediate the deformed lip portions 4 and 5 with the base portion 12b of the mounting bracket bridging the open channel of the leg section between the longitudinally extending lips 2. The bracket is thus held against sliding movement along the leg section 1 between the ramped lip portions 4 and 5. The camming lever 20 is mounted between the arms 13 of the bracket 12 by inserting a shaft 16 through aligned holes in the lever 20 and the arms 13, thus enabling the camming lever 20 to pivot between a down or locking position shown in FIG. 1 and an up or release position shown in FIG. 4 where the lever 20 is brought to a generally perpendicular position to the leg section 1 by pivoting the lever approximately 90 degrees away from the telescoping leg. A cam element 18 is provided on the lever 20 such that it overlies a window opening 17 defined in the outer leg section 1. A pressure plate 19 is disposed within the window opening, and is captive between the inner leg section 11 and the cam 18. In the locked position the cam 18 has a portion of greater radius 18b, shown in FIG. 3, which presses against the plate 19, which in turn presses against the inner leg section 11, creating a friction lock between the inner section 11 and the outer section 1 to prevent telescoping movement between the two sections. Desirably, the camming lever 20 is provided with a lever stop portion 21 which limits the locking movement of the lever towards the outer section 1, thereby correctly positioning the cam 18 with its maximum radius portion against the plate 19. The lock is released to allow telescoping sliding movement of the two leg sections by pivoting the lever 20 approximately 90 degrees to a generally erect position so that the cam portion 18b of large radius is rotated away from the plate 19, and the smaller radius portion 18a of the cam 18 overlies the plate 19, but does not press against the same.

The inner leg section 11 has opposing notches 23 cut into each of the longitudinally extending lips 22. A stop member 24 is held captive against longitudinal movement within the notches 23, but is free to move outwardly of the channel of the inner leg section 11, i.e., along a direction perpendicular to the telescoping axis of the support assembly 10. A coil spring 26 is compressed within a bore 25 between the end stop 24 and the bottom wall of the inner leg section 11, as best seen in FIG. 2, such that the stop member is normally urged by the spring 26 against the lips 2 of the outer leg section 1 during telescoping extension of the two leg sections. However, as the stop member 24 is moved towards the mounting bracket 12, the stop member moves underneath the ramped lip portions 4 which allow the stop member to move outwardly of the inner leg section 11 under the urging of spring 26. The stop member is thus brought into abutment with the undeformed lip portions 7 which underlie the mounting bracket 12, thereby preventing further telescoping extension of the leg sections 1 and 11. Normally the bracket 12 will be mounted near one end of the larger leg section 1, while the stop member 24 will be disposed in notches 23 cut into the lips of the inner leg section 11 near an opposite end of the inner section 11, so as to lock the two sections against telescoping extension near the maximum possible extension of the two sections.

The camming lever 20 can be operated at any relative position of the two leg sections 1 and 11, so as to lock the two leg sections at any arbitrary extension of the two sections to thereby obtain a support member or leg which is continuously variable in length.

The support bracket 12 may be easily and inexpensively manufactured by bending flat sheet stock such as elongated pieces of sheet steel into a U-shape and providing the bracket with the aligned holes necessary for receiving the lever shaft 16, thus realizing substantial savings in material and labor over tripod legs using the tubular lever mounts of the prior art.

While a particular embodiment of the invention has been shown and illustrated for purposes of clarity it will be understood that many changes, alterations and substitutions are possible without departing from the spirit and scope of the invention, which is limited only by the following claims:

I claim:

1. A lockable telescoping support comprising an outer and an inner channel section, a U-shaped mounting bracket having two arms connected by a base portion with each arm having a free end; said bracket mounted to the outer channel section and held against sliding movement therealong between deformed portions of said outer section; said bracket being retained against separation from said outer section only by a camming lever pivotably mounted between said free ends of said bracket for cammingly engaging the inner channel section through a window formed in the outer channel section thereby to lock said two sections against telescoping movement; and a stop member mounted to said inner section, said stop member being spring biased toward said outer section, longitudinally extending portions on the outer section for restraining said stop member against said spring bias during telescoping extension of said sections, said longitudinally extending portions being deformed in the vicinity of said mounting bracket for restraining the mounting bracket against sliding movement and also allowing movement of said stop member under spring bias into abutment with portions of said outer section to thereby limit further telescoping extension of said sections.

2. The lockable telescoping support of claim 1 wherein each channel section is of generally U-shaped cross section defining an open longitudinal channel and including longitudinally extending inturned lips projecting into said channel, portions of said lips being broken and deformed outwardly of said channel in the vicinity and on either side of said mounting bracket, said bracket thus being captive between said deformed lip portions against sliding movement along said outer section.

3. The lockable telescoping support of claim 1 wherein each channel section is of generally U-shaped cross section defining an open longitudinal channel and including longitudinally extending inturned lips projecting into said channel, portions of said lips being broken and deformed outwardly of said channel in the vicinity and on either side of said mounting bracket, said bracket being captive between said deformed lip portions against sliding movement along said outer section, said outwardly deformed lip portions allowing outward movement of said stop member under spring bias into abutment with said lip portions underlying said bracket to thereby limit said outer and inner sections against further telescoping extension.

4. The lockable telescoping support of claim 3 wherein said lip portions underlying said bracket are not deformed.

5. The lockable telescoping support of claim 3, wherein said deformed lip portions ramp outwardly of said channel so as to urge said stop member inwardly into said channel underneath said longitudinally extending lips against said spring bias during telescoping retraction of said inner section into said outer section.

6. The lockable telescoping support of any one of claims 1 through 3 further comprising a pressure plate disposed in said window and captive between said inner section and said camming lever.

7. The lockable telescoping support of claim 3, wherein said stop member is held against longitudinal displacement along said inner channel section within opposing notches cut in said lips of the inner section.

8. The lockable telescoping support of claim 7 wherein said stop member is urged outwardly of the inner channel section by a spring compressed between said inner section and said stop member.

9. The lockable telescoping support of claim 8, wherein said compressed spring is a coil spring.

10. The lockable telescoping support of claim 2, or claim 3 wherein said mounting bracket is a piece of sheet material bent into a U-shape having a pair of arms joined by a base portion, said base portion bridging said open channel.

11. The lockable telescoping support of claim 2 or claim 3 wherein said camming lever is provided with stop means for limiting pivotal movement of the lever towards said outer section.

12. The lockable telescoping support of claim 1 wherein said mounting bracket is a piece of sheet material bent to conform to the cross-sectional shape of said outer section.

13. A lock for a telescoping support of the type including an inner channel section telescopingly slideable within an outer channel section, said lock comprising:
a mounting bracket having a base portion and joining two parallel arms, said bracket being mounted to the outer channel section and held against sliding movement therealong by portions integral with said outer section, said bracket being retained against separation from said outer section by a camming lever pivotably mounted between said two arms for cammingly engaging the inner channel section through a window formed in the outer channel section thereby to lock said two sections against telescoping movement;
a stop member mounted to said inner channel section and spring biased against longitudinally extending portions on the outer section during telescoping extension of said channel portions, said longitudinally extending portions being outwardly bent in the vicinity and on either side of said mounting bracket for restraining the mounting bracket against sliding movement along the outer section, said outwardly bent longitudinal portions also allowing movement of said stop member under spring bias into abutment with portions of said outer section to thereby limit further telescoping extension of said sections.

14. The lock of claim 13 wherein each said channel section is of generally U-shaped cross section defining an open longitudinal channel and wherein said longitudinally extending portions are inturned lips projecting from opposed side walls into said channel.

15. The lock of claim 14 wherein said deformed longitudinal portions are lip portions ramping outwardly of said channel so as to allow said stop member to move gradually outwardly of said channel under spring bias, and also for urging said stop member inwardly into said channel underneath said longitudinally extending lips against said spring bias during telescoping retraction of said inner section into said outer section.

16. The lock of claim 13, 14 or 15 wherein said mounting bracket is a piece of sheet material bent to conform to the cross-sectional shape of said outer section.

17. A lock for an extendable suport of the type including an inner channel section telescopingly slideable within an outer channel section, said channel sections being of U-shaped cross section, each channel section including longitudinally extending lips projecting towards each other from opposing side walls in said channel, said lock comprising:
a U-shaped mounting bracket mounted to the outer channel section and held against sliding movement therealong by ramped lip portions adjacent to either side of said bracket, said bracket being retained against separation from said outer section by a camming lever pivotably mounted between the two arms of the bracket for cammingly engaging the inner channel section through a window defined in the outer channel section thereby to lock together said two sections against telescoping movement; and
a stop member mounted to said inner section and spring biased against the longitudinally extending lips of the outer channel section during telescoping extension of the two sections, said ramped lipped portions allowing movement of said stop member under spring bias into abutment with lip portions underlying said mounting bracket to thereby limit further telescoping extension of the two channel sections.

* * * * *